Sept. 15, 1931. L. G. DUCROUX 1,823,595
STEAM VALVE FOR COOKING CONTAINERS OR BOILERS
Filed Jan. 9, 1930
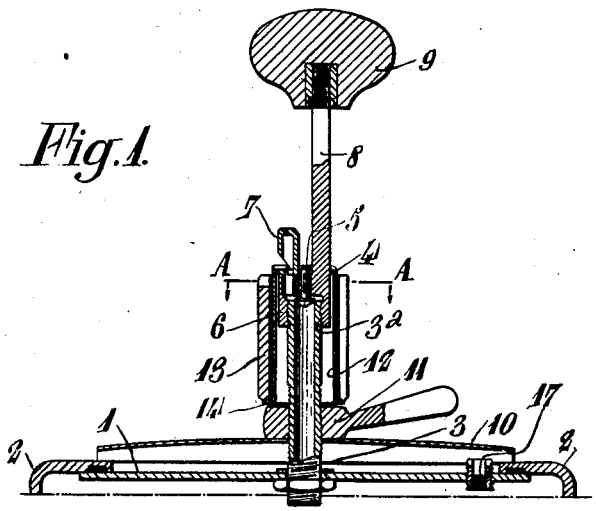
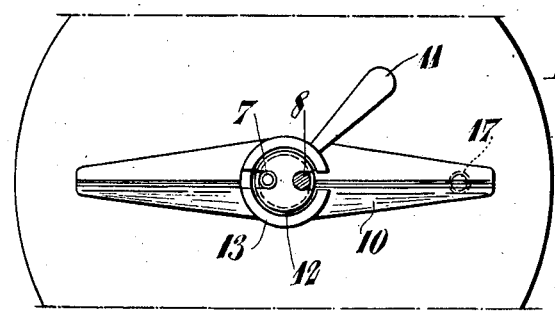
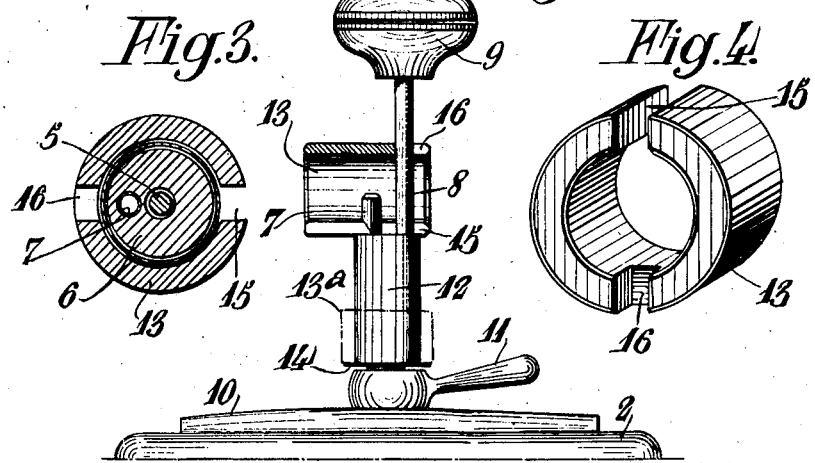

Patented Sept. 15, 1931

1,823,595

UNITED STATES PATENT OFFICE

LOUIS GEORGES DUCROUX, OF CACHAN, FRANCE, ASSIGNOR TO DANIEL BELMONTE, OF PARIS, FRANCE

STEAM VALVE FOR COOKING CONTAINERS OR BOILERS

Application filed January 9, 1930, Serial No. 419,694, and in France January 12, 1929.

This invention has for its object improvements in steam valves for containers intended for cooking food under pressure. It is intended to remedy the inconveniences of known devices which include a valve subjected to the thrust of a spring, the power of which is determined according to the pressure at which the valve is designed to operate. These springs have to be regulated in a heated condition and under other conditions for which they are intended to be used. Such regulation is a difficult matter. Moreover, said springs are subjected in service to an annealing action which modify their resiliency, and they have to be frequently regulated.

In order to remedy this inconvenience, the invention has for its first object, an arrangement in which the steam valve is subjected to the action of properly designed weights according to the desired pressure within the container in connection with which the valve is to be used.

The invention relates specifically to means for carrying out the above feature, i. e. weights comprising sleeves, which are placed coaxially with the valve, and act upon the latter by the intermediary of a cap, the top of which rests upon the stem of the valve.

Such weights, combined with the cap have the advantage of not being cumbersome, and that they protect the hand against steam jets issuing from the valves with which they are used.

The invention includes within its scope the application of the above means to all cases in which it is required to regulate a valve for any purpose.

It has also for its object the following improvements specially applicable to closed containers used for cooking food under pressure:

(a) The relief valve used in connection with the container is arranged in a box screwed upon a tube mounted on the cover at the upper end of which tube is provided a seat for the valve, the said box carrying an alarm whistle and having an extension thereon, and carrying a handle for handling the cover of the container when same is in a heated condition.

(b) A securing nut screwed upon the aforesaid tube permits the steam from the container to escape, and by bearing upon a transverse member ensures the fixation of the cover upon the container, and said nut is made of proper thickness to lift when unscrewed, a cap which carries a weight, in order to open a valve which reduces the pressure in the container before the latter is opened, all of which will be more fully explained herein.

This arrangement is advantageous because it prevents an absent minded operator from being burnt by an intense jet of steam when the cover is opened before the pressure in the container is sufficiently reduced.

(c) A fusible safety obturator is provided upon the cover, same being placed under a transverse member so that, in case of a super-pressure, in the container the force of steam jet issuing through the relief valve is broken, and cannot burn the hands of the operator.

The accompanying drawings show, by way of example only, a form of realization of the improvements above mentioned.

Figure 1 is a vertical central section of a cover for a boiler to which are applied the improvements forming the subject-matter of the present invention.

Figure 2 is a corresponding plan view of Fig. 1 with some of the parts broken away and in section.

Figure 3 is, at an enlarged scale, a horizontal section on line A—A of Fig. 1.

Fig. 4 is a perspective view of a weight for regulating the valve.

Fig. 5 is a side elevation, partly in section, of the device as illustrated in Fig. 2, showing one of the weights acting as a key for unscrewing the valve-box of the device in hand.

The cover 1 of the container of boiler 2 is provided at its center with a tube 3, fastened in a fluid-tight manner thereon, and at the upper part of which is provided a seat for a valve 4. The stem 5 of the valve 4 is guided in the bore of a box 6 screwed upon the threaded end 3ᵃ of the tube 3. The box 6 carries the alarm whistle 7 and is extended by a stem 8, the free end of which carries a handle 9, of wood or other insulating material which permits handling of the cover 1.

Before screwing the box 6 upon the tube 3, a transverse member 10 is placed upon the said tube with its securing nut 11. When the cover 1 is, in a known manner, secured on the container 2, a hollow cap 12, the top of which is provided with two apertures for accommodating the stem 8 and the whistle 7, is slid over the box 6, so that its top rests on the stem 5 of the valve 4. In order to permit the mounting of the cap 12, the handle 9 is removably fastened upon the stem 8. It may, for instance, be screwed on to the stem 8 as shown in the example illustrated in the drawings by Figure 1.

Provision is made for a set of weights comprising a set of sleeves 13, made of a suitable dense metal. The internal diameter of these sleeves is chosen so as they may engage over the cap 12, and rest upon an under flange 14 formed on the latter. The sleeves are slotted at 15 along a generatrix as shown in Fig. 4, so as to permit them to pass beyond the stem 8 and engage the cap 12 without necessitating the removal of the handle 9. A predetermined weight sleeve acting, by the intermediary of the cap 12, upon the valve 4, permits the latter to be lifted only in the case of a certain pressure also predetermined for the interior of the container 2. The weights may comprise a set similar to the set of weights used in connection with a set of scales, in order to permit various combinations for securing any predetermined load upon the valve. Fig. 5 shows a small weight corresponding to a lift of the valve with a comparatively low pressure within the container 2.

The weight illustrated in Fig. 5 is provided with a notch 16 diametrically opposed to the slot 15, thus permitting, as can be seen in Fig. 5, the use of the weight as a key acting upon the stem 8 and the whistle 7, for screwing or unscrewing the box 6 from the tube 3.

As above mentioned, when the operator removes a weight 13, or the cap 12, the hand is protected if steam is coming out the whistle 7, as follows: When the nut 11 is unscrewed, its upper face touches the under side of the flange 14 of the cap 12 and lifts the latter which discharges the valve before the cover is opened, the steam issuing from the valve being discharged through the ends of the cylindrical weight 13.

To the end above indicated, the safety fusible obturator 17 is located under the transverse member 10 for the well known and readily understood purpose of relieving completely the pressure within the container, when a super-pressure is attained therein.

Of course, the example of construction specifically described and illustrated, may be modified without departing from the scope of the invention. The latter is defined by the features set forth and includes all suitable means permitting an embodiment of the said features for obtaining the results indicated.

What I claim as my invention and desire to secure by Letters Patent is:—

1. In a steam valve arrangement for cooking containers, a tube fastened on a cover of a container, a seat for a valve at the upper end of the said tube, a valve box secured to the latter, an alarm whistle upon the said box, a valve the stem of which passes through the top of the box, a cap engaging the box and resting upon the upper end of the valve stem and sleeve weights shaped for loading the said cap.

2. In a steam valve arrangement for cooking containers, a cover for a container, a tube secured upon the said cover, a valve seat at the upper end of the said tube, a valve box screwed upon the latter, an alarm whistle and a handle upon the said valve box, a valve the stem of which passes through the top of the valve box, a cap engaging the said valve box with its top resting upon the valve stem, sleeve weights shaped for loading the said cap and one of which may act as a key for screwing or unscrewing the valve box, a transverse member engaging the tube, a nut screwed on the latter and bearing upon the said transverse member for securing the cover upon the container.

3. In a steam valve arrangement for cooking containers, as claimed in claim 2, the arrangement of a safety fusible obturator in the cover of the container and under the transverse member, the nut screwed upon the tube with its height being determined so as to lift the cap and discharge the valve, when the said nut is unscrewed, and before the cover is open.

4. In a steam valve arrangement for cooking containers, a normally sealed cover therefor, a vertical tube mounted therein, a transverse member having an opening in each end of same, mounted on the tube, a relief valve in the upper end of the tube, a valve box adjustably mounted on the tube, a valve, the stem of which passes through the top of the valve box, a cap provided with a projecting flange engaging the valve box, and having its top resting upon the valve stem, weights carried by the cap flange for normally holding the valve on its seat in closed position, an adjustable securing nut mounted on the vertical tube, of slightly less head thickness, then the distance between the cap flange and the transverse member, adapted when slightly unscrewed on the tube, to lift the relief valve from its seat and permit steam from the interior of the container to escape, and a safety fusible obturator in the cover, adapted to discharge steam through the openings of the transverse member when the pressure in the container reaches a predetermined point.

In testimony whereof I have signed this specification.

LOUIS GEORGES DUCROUX.